United States Patent [19]

Moran et al.

[11] Patent Number: 4,500,240

[45] Date of Patent: Feb. 19, 1985

[54] BOLT FASTENER

[75] Inventors: Thomas M. Moran, Cleveland; Benedict J. DiBello, Strongsville, both of Ohio

[73] Assignee: Eaton Corporation, Clevaland, Ohio

[21] Appl. No.: 488,832

[22] Filed: Apr. 26, 1983

[51] Int. Cl.³ ............................................. F16B 37/04
[52] U.S. Cl. .................................................... 411/103
[58] Field of Search ................ 411/107, 103, 83, 105, 411/111, 112, 113, 119, 120, 121, 337, 352, 516, 520, 522

[56] References Cited

U.S. PATENT DOCUMENTS

| | | | |
|---|---|---|---|
| 473,054 | 4/1892 | Beers | 411/516 X |
| 1,456,990 | 5/1923 | Montgomery | 411/516 X |
| 1,528,777 | 3/1925 | Marting | |
| 2,360,424 | 10/1944 | Kauffman, Jr. | 68/262 |
| 2,495,037 | 1/1950 | Tinnerman | 411/112 |
| 2,605,806 | 8/1952 | Tinnerman | 151/41.75 |
| 2,644,502 | 7/1953 | Tinnerman | 411/107 |
| 2,654,411 | 10/1953 | Bedford, Jr. | 151/41.75 |
| 2,748,906 | 6/1956 | Flora | 189/35 |
| 2,899,700 | 8/1959 | Egan | 16/30 |
| 3,050,097 | 8/1962 | Cochran | 151/41.75 |
| 3,602,284 | 8/1971 | Smith | 151/69 |

FOREIGN PATENT DOCUMENTS

| | | | |
|---|---|---|---|
| 2415855 | 10/1975 | Fed. Rep. of Germany | 411/112 |
| 1315841 | 12/1962 | France | 411/83 |

Primary Examiner—Thomas J. Holko
Assistant Examiner—Adrian H. Whitcomb, Jr.
Attorney, Agent, or Firm—C. H. Grace; A. E. Chrow

[57] ABSTRACT

Disclosed is a bolt fastener adapted to rotatably or non-rotatably secure a bolt to a frame through an aperture therethrough. The fastener is provided with a base member having a slot therethrough and a resilient arm that extends upwardly from an edge of the base member and, in spaced relationship, across the side thereof that is to face away from the side of the frame against which the base member is to be laid and then downwardly past an opposite edge of the base member and then inwardly towards a plane generally transverse to the plane of the base member to a free-end thereof disposed in the side of the base member facing towards the frame against which the base member is to be laid to provide an open-ended clip. The space between the base member and resilient arm is adapted to receive the head of the bolt and, dependent upon the relationship between the shape of the slot and the shape of the bolt shank portion, either rotatably or non-rotatably secure the bolt to the fastener, when the bolt shank portion is inserted into the slot with the open ended clip being adapted such that it is able to be urged towards the frame and snapped about an edge thereof to releasably secure the fastener to the frame when the bolt shank portion is inserted into the frame aperture with the base member laid thereagainst.

4 Claims, 7 Drawing Figures

U.S. Patent  Feb. 19, 1985  4,500,240
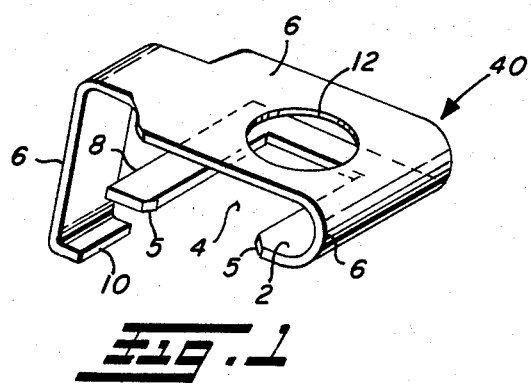
_Fig. 1_
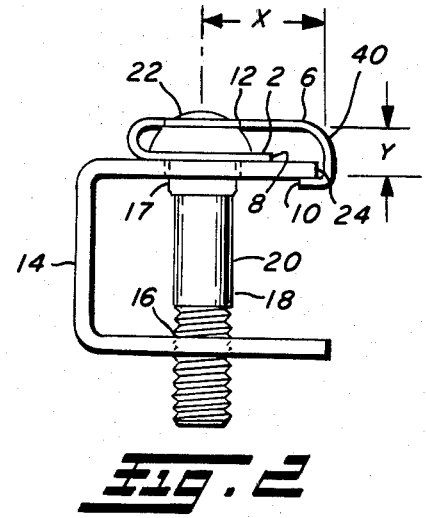
_Fig. 2_
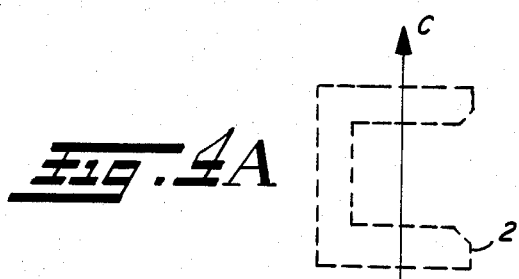
_Fig. 4A_
_Fig. 4B_
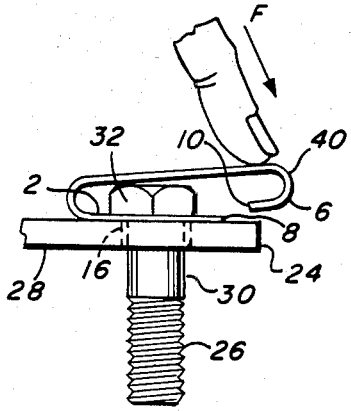
_Fig. 3_
_Fig. 4C_
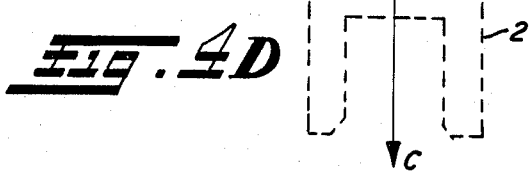
_Fig. 4D_

BOLT FASTENER

INTRODUCTION

This invention relates generally to a fastener for securing a bolt to a frame through an aperture therethrough and more particularly to a fastener that, dependent upon the type of bolt used, is able to rotatably or non-rotatably secure the bolt to a frame such as a panel or the like through an aperture therethrough by means of a simple snapping action.

BACKGROUND OF THE INVENTION

Fasteners of various types for securing a bolt to a frame have been known for many years. Generally, they provide a means of securing the bolt to a frame prior to installation or a nut onto the bolt when such is desired for convenience such as for providing a means of positioning and holding the bolt in difficult-to-reach locations and a variety of other reasons. Such fasteners are generally distinguished by their respective ability to enable or to prevent relative rotation between the fastener and the bolt and consequently between the bolt and the frame to which the fastener is secured.

Examples of fasteners that permit relative rotation between the fastener and the bolt are shown for example in U.S. Pat. Nos. 2,630,424; 2,605,806; 2,654,411; and 3,602,284, the disclosures of which are incorporated herein by reference. Although U.S. Pat. No. 2,360,424 discloses a clip for rotatably securing an adjusting screw to a washing machine wringer, the clip requires two opposed hooked flanges which would not be suitable where only one edge of a frame to which a bolt is to be secured is available. The fastening device of U.S. Pat. No. 2,605,806 requires two opposed spring flanges to rotatably secure a bolt to a frame by extending through the same opening in the frame through which the bolt is to be received and necessarily requires that the opening be large enough to receive both the bolt and the flanges. U.S. Pat. No. 2,654,411 discloses a clip for rotatably securing a bolt to a frame that requires both an annular groove in the bolt shank and that the frame have an offset in order for the clip to work. A spring wire screwshaft retainer is disclosed in U.S. Pat. No. 3,602,284 that requires two doubly bent limbs and an annular groove in the screw shank and a "T" shaped groove in the structure to which the screw is rotatably secured in order to work.

Examples of types of fasteners used to fixedly secure a bolt to a frame and prevent rotation between the fastener and the bolt are disclosed for example in U.S. Pat. Nos. 1,528,777; 2,748,906; 2,899,700; and 3,050,097, the respective disclosures of which are incorporated herein by reference. U.S. Pat. No. 1,528,777 discloses a nut and bolt locking device that features a pair of opposed upwardly projecting members that are adapted to fit in a tee slot to prevent rotation of a bolt assembly. Although U.S. Pat. No. 2,748,906 discloses a fastening device that is able to be clipped onto the edge of a frame, the device must be pressed on from a side of the frame and requires opposed abutting edges to prevent rotation of the bolt. Although U.S. Pat. No. 2,899,700 discloses a means for snapping a caster onto a bolt head, the caster requires a recess for preventing relative rotation between the caster and the bolt. U.S. Pat. No. 3,050,097 discloses a snap-in bolt retainer that utilizes a complex arrangement of tabs and tangs to secure the fastener to an opening in a frame that is required to have the same shape as the fastener and which also prevents the fastener from rotating with respect to the fastener and the frame when the fastener is secured to the frame opening.

It is evident from the above that a need exists to provide a simple and low cost fastener that by means of a simple snapping action is able, dependent on the type of bolt used, to rotatably or non-rotatably secure a bolt to a frame through an aperture therethrough and which does not require a specially shaped opening through the frame and does not require special machining of the bolt.

SUMMARY OF THE INVENTION

Accordingly, it is an object of this invention to provide a fastener of simple design for securing a bolt to a frame through an aperture therethrough.

It is another object of this invention to provide a fastener of simple design that is easy to manufacture and is able to secure a bolt to a frame through an aperture therethrough.

It is still another object of this invention to provide a fastener that by means of a simple snapping action is able, depending upon the type of bolt used, to rotatably or non-rotatably secure a bolt to a frame through an aperture therethrough that does not require the opening to have an oversized or special shape and does not require specialized machining of the bolt.

BRIEF DESCRIPTION OF THE DRAWINGS

FIG. 1 shows a perspective view of an embodiment of the fastener of the invention in the form of fastener 40 that is able to rotatably secure a bolt to a frame.

FIG. 2 shows a side elevation view of fastener 40 of FIG. 1 fixedly securing a bolt to a frame;

FIG. 3 shows a side elevation view of fastener 40 of FIG. 1 in the process of rotatably securing a bolt to a frame; and FIGS. 4A—4D, respectively, show a schematic plan view of variation in the direction between the base member slot and the overhanging resilient arm of the fastener of the invention.

DESCRIPTION OF A PREFERRED EMBODIMENT

Fastener 40 of FIG. 1 provides a means of rotatably or non-rotatably securing a bolt to a frame through an aperture therethrough. Fastener 40 has a base member 2 having a slot 4 extending from an edge thereof that is dimensionally adapted to receive the shank of a bolt such as non-circular (square) portion 17 of shank portion 20 of conventional carriage bolt 18 shown in FIG. 2 and shank portion 28 of machine bolt 26 shown in FIG. 3. The leading edges of base member 2 adjacent slot 4 are preferably provided with tapers 5 as shown in FIG. 1 to facilitate the insertion of shank portion 20 into slot 4. A resilient arm 6 extends upwardly from an edge of base member 2 and across the side of base member 2 that is to face away from the frame to which fastener 40 is to be secured to an opposite edge 8 of base member 2 and thence downwardly past opposite edge 8 and thence inwardly towards slot 4 to a free-end 10 thereof that is disposed on the side of base member 2 that is to face away from the frame to which fastener 40 is to be secured. Arm 6 is preferably substantially parallel to the side of base member 2 facing away from the frame to which fastener 40 is secured. The space between arm 6 and the side of base member 2 facing away from the frame to which fastener 40 is to be secured is dimensionally adapted to resiliently receive the head of a bolt that is to be secured to the frame such as head 22 of carriage bolt 18 shown in FIG. 2 and head 32 of bolt 26 shown in FIG. 3 with sufficient force to secure the bolt to fastener 40. Arm 6 preferably has an opening 12 therethrough that is substantially aligned with the centerline of slot 4 and with the aperture through the frame into which the bolt is to be received for receiving a portion of the head of the bolt to which fastener 40 is to be secured such as shown in FIG. 2 for allowing access to the bolt head for a screw driver and the like.

FIG. 2 shows fastener 40 of FIG. 1 secured to frame 14. Frame 14 is of a "U" shaped construction having coaxially aligned apertures 16 for receiving bolt 18 therethrough. Bolt 18 is a conventional carriage type bolt having a non-circular (square) portion 17 disposed intermediate an elongate shank portion 20 and a head portion 22. Apertures 16 are larger in diameter than the diameter of shank portion 20 by an amount enabling bolt 30 to be received therethrough Head portion 22 of bolt 18 is sufficiently larger than the outside diameter of shank portion 20 and square portion 17 to ensure that head portion 22 engages with the side of base member 2 facing away from frame 14 adjacent slot 4. In FIG. 2, shank portion 20 has been inserted into slot 4 and arm 6 has been spread apart from base member 2 for a distance to enable head 22 to be received into the space between arm 6 and the side of base member 2 facing away from frame 14 and then released so that arm 6 presses head 22 against base member 2 with a portion of head 22 extending through opening 12 with sufficient force to secure fastener 40 to bolt 18. Although, as previously described, it is preferable to have an opening 12 through arm 6 for receiving a portion of the head of a bolt to which the fastener of the invention is to be secured, it is to be understood that fasteners made in accordance with the invention include those having no opening through arm 6 such as where it is desired to have arm 6 press against the top of the head of the bolt.

The distance "X" from the centerline of apertures 16 to edge 24 of frame 14 determines the distance by which arm 6 extends past opposite edge 8 of base member 2 to ensure that the downward projection of arm 6 is able to clear edge 24 of frame 14. The distance "Y" that arm 6 projects downwardly is determined by the height of arm 6 above the side of base member 2 facing away from frame 14 and the thickness of frame 14. Free end 10 of arm 6 extends inwardly towards bolt 18 on the side of base member 2 facing towards frame 14 for a distance sufficient to insure that arm 6 can be snapped about edge 24 to secure fastener 40 to frame 14.

The width of slot 4 is sufficient to enable non-circular portion 17 of bolt 20 to be received at least partially therethrough so that when head 22 is inserted into the space between base member 2 and arm 6, bolt 20 is prevented from rotation with respect to fastener 40. Generally, arm 6 is shaped in the order of an open-ended clip having sufficient resilience such that when base member 2 is laid against frame 14 with bolt head portion 22 disposed to the space between arm 6 and base member 2 as shown in FIG. 2 and with bolt shank portion 20 received through apertures 16, the free-end of arm 6 is able to be snapped about edge 24 of frame 14 to secure fastener 40 to frame 14.

FIG. 3 shows fastener 40 in the process of rotatably securing a machine bolt 26 through aperture 16 of frame 28. Bolt 26 is a conventional machine bolt having an elongate shank portion 30 extending from a hexagonally shaped head portion 32. In contrast to carriage bolt of FIG. 2, bolt 26 has no non-circular portion 17 and, since shank portion 30 is generally circular in cross-section, bolt 26 is able to rotate in with respect to fastener 40 and with respect to frame 28 when bolt 26 is inserted through aperture 16 and fastener 40 is secured to frame 28.

As previously described with respect to FIG. 2, arm 6 is a resilient arm that extends from an edge of base member 2 in a spaced-apart relationship across the side of base member 2 facing away from the side of the frame to which base member to is to be laid against and thence beyond opposite edge 8 of base member 2 and thence towards the plane of base member 2 and thence inwardly beneath itself to a free-end 10 thereof to provide an open-ended clip adapted to be pressed with a finger or the like to provide a force "F" that causes arm 6 to snap about edge 24 of frame 2 to secure fastener 40 thereto.

Thus, the fastener of the invention may be used to fixedly secure a common carriage or similar type bolt to a frame by means of having a slot 4 therethrough adapted to receive a non-circular portion of the bolt adjacent the head to prevent the rotation of the bolt and to enable other type bolts not having a non-circular portion adjacent the head to rotate within slot 4 and thus be able to rotate with respect to the frame to which the fastener of the invention is secured.

Although it is preferred that the slot through the base member of the fastener of the invention be oriented in a direction transverse to the direction in which arm 6 extends across base member 2 as shown in FIG. 2, the direction of slot 4 with respect to the direction in which arm 6 extends across body member 2 may be any direction suitable to enable the bolt to be received into the frame aperture and enabling arm 6 to be snapped about an edge of the frame to secure the fastener to the frame. For illustration purposes, where the direction of arm 6 is in a direction "C" across the base member of the fastener of the invention, FIG. 4A shows where slot 4A may be transverse to direction "C"; FIG. 4B show where the direction of slot 4 may be in the same or in an opposite direction along direction "C"; and FIG. 4C shows where the direction of slot 4 may be at any askew angle with respect to direction "C".

Although the fastener of the invention may be made in any suitable manner, the fastener is preferably a one-piece construction made by folding a stamping or the like into the configuration described herein. Although base member 2 may be made from a material different from arm 6, both arm 6 and base member 2 are preferably made from a single material such as spring steel or the like in an appropriate thickness to provide arm 6 with the amount of resilience required to secure the bolt to the fastener of the invention and to secure the fastener of the invention to the frame in the manner hereinbefore described.

What is claimed is:

1. A fastener for securing a bolt to a frame through an aperture therethrough, said bolt having adjacent head and elongate shank portions, said fastener having a base member having a slot therethrough extending from an edge thereof that is dimensionally adapted to receive the bolt shank portion, a resilient arm extending upwardly away from an edge of the base member and thence in spaced-apart overhanging relationship across the side of the base member facing away from the frame to which the bolt is to be secured to an opposite edge thereof and thence downwardly past the base member opposite edge and thence inwardly to a free-end thereof disposed on the side of the base member facing towards the frame to which the bolt is to be secured to provide an open-ended clip adapted to clip the fastener to an edge of the frame, said arm and base member spaced-apart for a distance sufficient to insure that the bolt head portion is received therebetween when the bolt shank portion is received into the base member slot, and said fastener, bolt and frame cooperating with each other such that the arm is able to press the bolt head portion against the base member when the bolt shank portion is received into the slot and the arm is able to be snapped about the edge of the frame to secure the fastener thereto when the bolt shank member is received into the frame aperture with the base member laid against the frame.

2. The fastener of claim 1 including an opening through the arm adapted to receive a portion of the bolt head portion therethrough.

3. The fastener of claim 1 wherein the bolt shank portion received through the base member slot has a generally circular cross-section enabling the bolt to rotate with respect to the fastener when the fastener is secured to the bolt and with respect to the fastener and the frame when the fastener is secured to the frame.

4. The fastener of claim 1 wherein the bolt has a generally non-circular portion disposed intermediate the head and shank portions that is at least partially received into the base member slot in an amount sufficient to enable the base member to prevent rotation of the bolt with respect to the fastener and with respect to the fastener and the frame when the fastener is secured to the frame.

* * * * *